United States Patent [19]
Long

[11] Patent Number: 5,926,505
[45] Date of Patent: Jul. 20, 1999

[54] DEVICE, SYSTEM, AND METHOD FOR MODEM COMMUNICATION UTILIZING TWO-STEP MAPPING

[75] Inventor: Guozhu Long, Raleigh, N.C.

[73] Assignee: Cirrus Logic, Inc., Fremont, Calif.

[21] Appl. No.: 08/731,500

[22] Filed: Oct. 16, 1996

[51] Int. Cl.[6] .................................................. H04B 1/38
[52] U.S. Cl. ................................... 375/222; 375/295
[58] Field of Search .................................. 375/222, 219, 375/220, 265, 295, 261; 379/90.01; 395/200.3

[56] References Cited

U.S. PATENT DOCUMENTS

| | | | |
|---|---|---|---|
| 5,428,641 | 6/1995 | Long | 375/295 |
| 5,448,555 | 9/1995 | Bremer et al. | 375/222 |
| 5,659,579 | 8/1997 | Herzberg | 375/265 |

*Primary Examiner*—Temesghen Ghebretinsae
*Attorney, Agent, or Firm*—J. P. Violette; Robert P. Sabath

[57] ABSTRACT

Modem technology is implemented in a system including a personal computer (PC) to enable communication over a PSTN using communication software which includes a mapping algorithm for mapping data into u-law signal points, which are divided into segments with different distances.

2 Claims, 11 Drawing Sheets

DEVICE, SYSTEM, AND METHOD FOR MODEM COMMUNICATION UTILIZING TWO-STEP MAPPING

FIELD OF THE INVENTION

This invention relates generally to a modem device, modem-based system and method for signal communication, and more particularly to high speed modem communication utilizing two-step mapping techniques.

BACKGROUND OF THE INVENTION

Certain known conventional modem devices, systems and methods communicate signals between personal computers (PCs) through public switched telephone networks (PSTNs). In order to implement such communication frame mapping techniques have been and are currently utilized. However, as modems improve in performance, there is an increased need to implement different frame mapping techniques to minimize the average power for a given shaping gain.

SUMMARY OF THE INVENTION

In accordance with the present invention, a PC for transmitting and receiving signals over a PSTN utilizes a two-step mapping algorithm to reduce or minimize the average power for a given shaping gain. The PC includes a modem that communicates with a device, such as another PC, minicomputer, mainframe computer, FAX machine, over the PSTN. The modem includes a two-step mapping device which utilizes a secondary generating function to minimize (or reduce) the use of signal points with the smallest distance and reduce the error rate.

DETAILED DESCRIPTION OF THE PREFERRED EMBODIMENTS

Figure 1A:
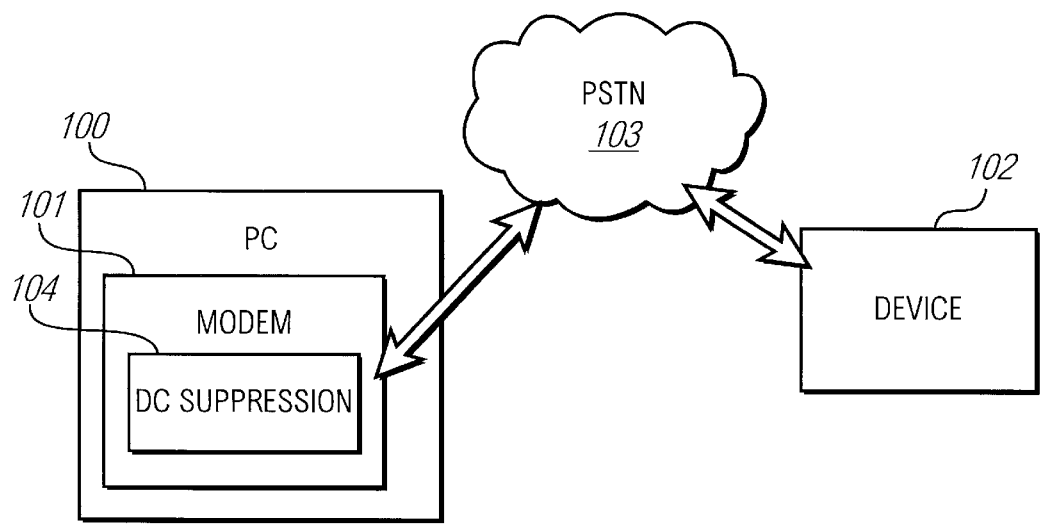
FIG. 1A is a block diagram of a PC communication system utilizing public switched telephone networks according to the present invention.

Referring to FIG. 1A, an implementation according to the present invention is shown in which PC 100 includes modem 101 and communicates with device 102, such as another PC, minicomputer, mainframe computer, FAX machine, over PSTN 103. Modem 101 may operate at a digital signal transmission/reception rate of 14,400 (14.4k), 28,800 (28.8k), 33,600 (33.6k), 56,000 (56k), or some other signal rate (referred to as baud) and includes two-step mapping device 104 which which utilizes a secondary generating function to minimize (or reduce) the use of signal points with the smallest distance and reduce the error rate.

Figure 1B:
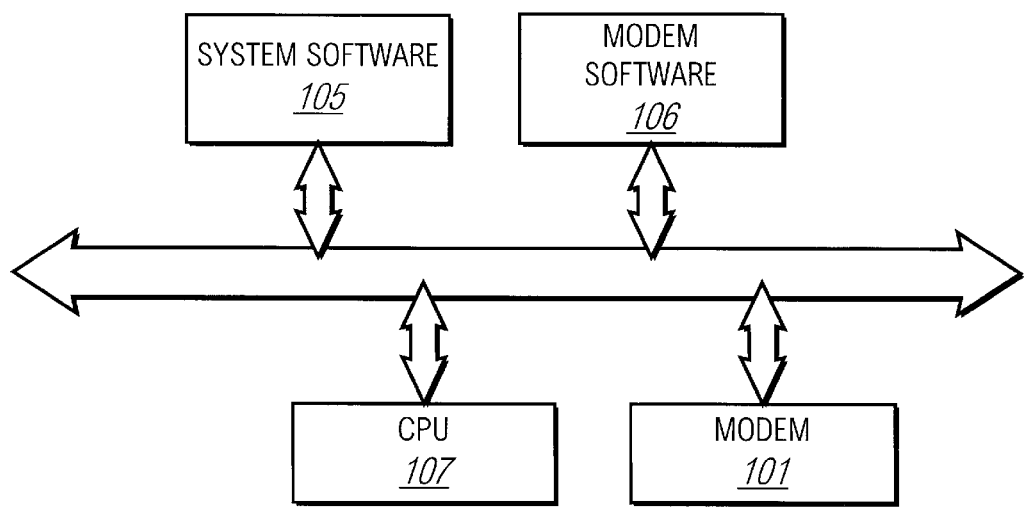
FIG. 1B is a block diagram of a PC according to the present invention.

Referring to FIG. 1B, PC 100 includes PC system software 105 and PC modem software 106 connected to central processor unit (CPU) 107 through conventional data and instruction bus 108. Modem software 106 is operated by CPU 107 to coordinate the operation of modem controller (not shown) and direct the transmission of signals through modem 106. During operation of modem software 104 by CPU 107, digital signals, which may correspond to a screen image in the case of a data signal transmission or a block of speech in the case of an audio signal transmission, are generated and ordered in digital signal frames within modem 101. Each frame contains information associated with N symbols and is defined by K binary bits. The K binary bits are ordered in a digital signal stream and divided into segments.

Figure 2:
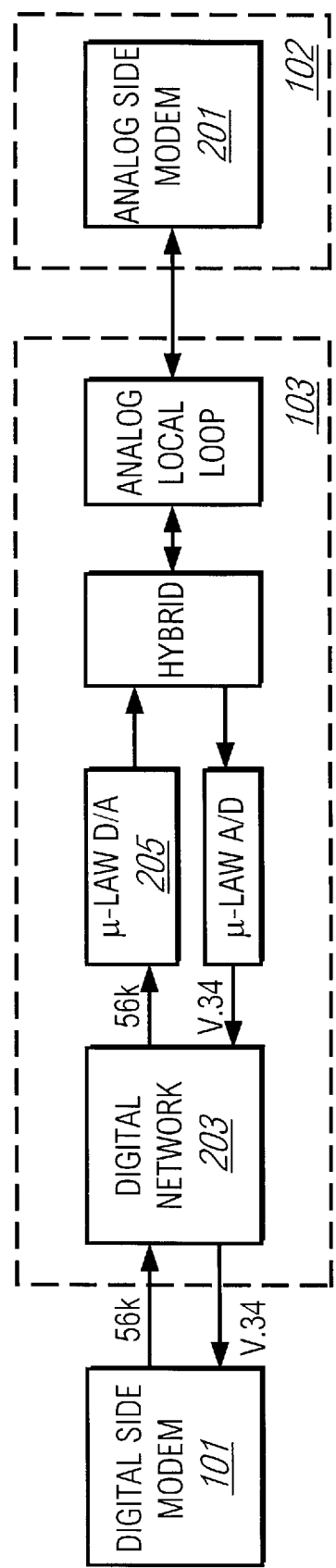
FIG. 2 is a block diagram of a 56k baud modem communication system according to the present invention.

Referring to FIG. 2, a 56k baud modem communication system is shown connecting digital modem 101 through PSTN 103 to analog modem 201 connecting to device 102. The sampling rate is 8 kHz. At each sample, a set of input bits operated upon by a scrambler (not shown). The scrambler output is used by an encoder (not shown) to generate output digital samples. These samples are sent through digital network 203 to $\mu$-law D/A 205 and converted into analog signals.

$\mu$-law D/A 205 uses a sign-magnitude format with a total of 255 possible input digital values. Those 255 values are divided into 16 segments: +1, +2, ..., +8, −1, −2, ..., −8. The distance between two adjacent points in the i-th segment is $c*2^{|i-1|}$. For simplicity in discussion but not limiting the value thereto, consider c=1. Segments +1 and −1 have the smallest distance 1, and the point 0 is shared by both segments. These two segments with the smallest distance may be excluded without a significant loss in transmission or reception quality, leaving 224 points. Note that a next smaller pair of points may be excluded and so forth in order to increase the smallest distance. For every 32 points excluded, the smallest distance is doubled, with a resulting gain of 6 dB noise margin.

Among all the points that are useable in signal transmissions, the outer points have the largest distances and are the preferred points for utility.

In order to use the larger points more often, a conventional shell mapping algorithm may be modified and applied. For instance, a conventional V.34 modem divides the 2-dimensional signal constellation into M rings each of which has the same number of points. These M rings are ordered based on the averaged power in the ring. The shell mapping algorithm chooses the inner rings more often to reduce the total averaged power.

In the present invention, the one-dimensional points are divided into 2m segments: ±(9−m), . . . , ±7, ±8, m=1, 2, . . . , 7. The +i and −i segments are merged into one segment with segment index 8-i. The segment index is ordered from the largest energy to the smallest energy.

Figure 3:
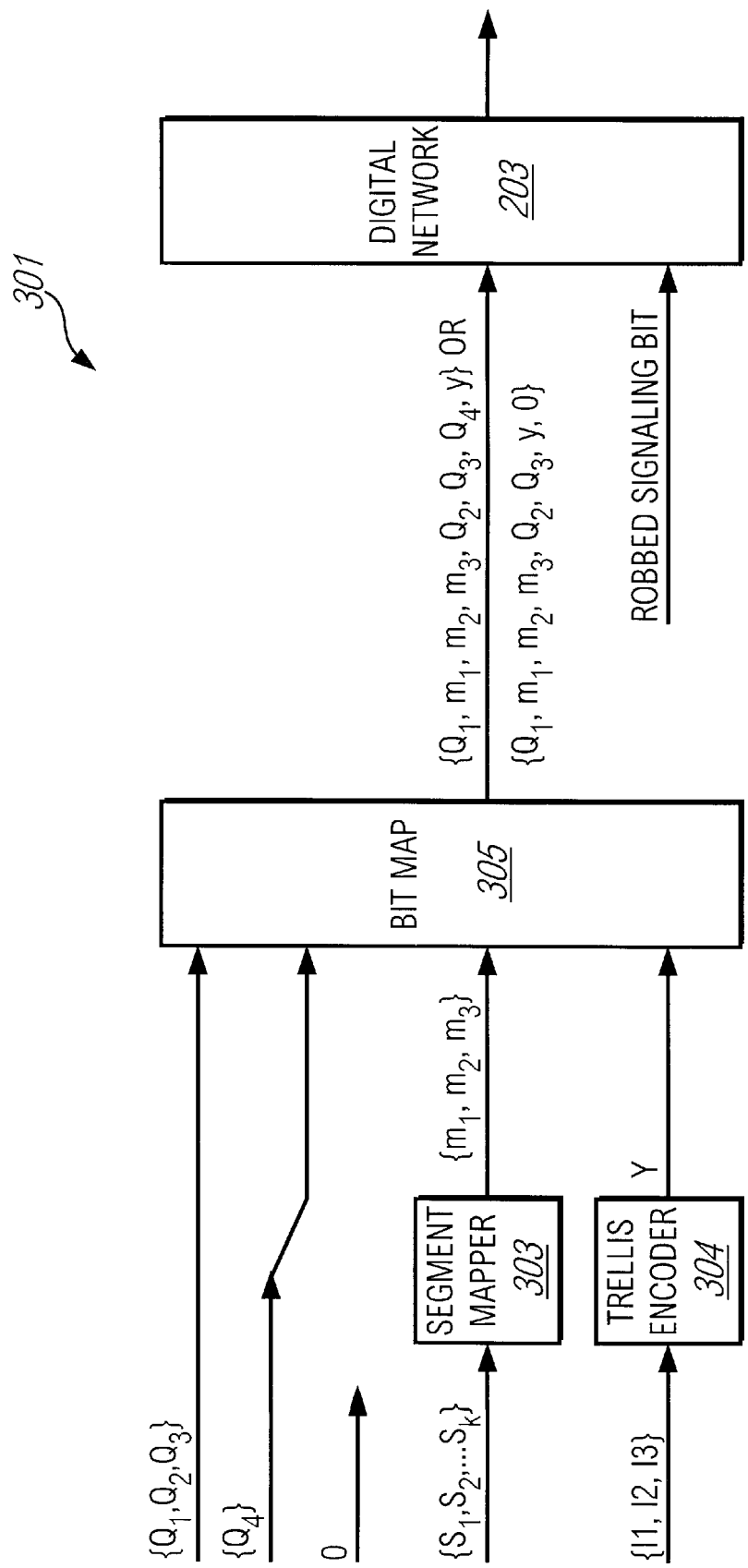
FIG. 3 is a block diagram of a coded encoder for a 56k baud modem communication system according to the present invention.

Referring to FIG. 3, encoder 301 is shown connected to digital network 203 and receiving multiple inputs. Encoder 301 includes segment mapper 303 and trellis encoder 304 which both provide input signals to bit map 305. Upon encoding the transmittal signals, encoder 301 transmits from bit map 305 onto digital network 203.

Now, more specifically, by selecting M useable points and transmitting K bits in a frame of N symbols, the data rate is 8000K/N bits/sec. The M points are divided into m=M/32 segments 0,1, . . . m−1. Note that neither K/N, which is the bit per symbol, nor K are required to be integers. A frame switch technique may be applied for non-integer K cases. However, for simplicity of discussion, assume K to be an integer. If 5 bits are required to select a point within a segment, k=K−5N bits may be used to do "segment mapping". The largest possible k can be found from the following inequality: $2^k \leq m^N$. For example, if 192 points are used and the mapping frame size is 8, then m=6, and k≤20.68. If a value of k=20 is used, 7.5 bits per symbol are transmitted, and the data rate is (k+5N)*8000/N=60 kbps.

To send signaling information, one bit is conventionally used (robbed) in every 6 symbols, however some older codecs use one bit from each symbol. Therefore, one bit out of every six symbols, the LSB is left for the robbed signaling bit, leaving M/2 possible points for usage, however it may be noted that the invention may be modified to accommodate the older codec requirements. With M/2 possible points, 4 bits may be used to choose an even point The data rate is then reduced by 8000/6=1333.33 bps. For some old codecs, the robbed signaling bit is used in every symbol, and thus the data rate is reduced by 8 kbps.

The largest possible k is not required to be used. If a small k is used, some "distance gain" may be obtained since there is freedom to use outer points.

If a value of N=8 is selected, then the segment mapping algorithm applied may be the same as the shell mapping algorithm utilized in conventional V.34 modems. In the shell mapping algorithm, the cost function is approximated by a linear function which is a good approximation to minimize the averaged power but not average distance.

If a criterion is to minimize the averaged distance, then the ideal cost function should be inversely proportional to the distance, which is an exponential function. For instance, if 7 segments are used, choosing two segment 5 points, one segment 4 point and one segment 6 point results in the same cost if a linear cost function is used, however the average distances are 128 and (256+64)/2=160, respectively. Ideally, the mapping algorithm should therefore be modified so that the maximum average distance can be obtained.

In one alternative for a shell mapping algorithm, suppose there are 7 rings, a generating function may be implemented as follows:

$$g1=1+x+x^2+x^3+x^4+x^5+x^6.$$

$$g2=g1*g1=1+2x+3x^2+4x^3+5x^4+6x^5+7x^6+6x^7+5x^8+4x^9+3x^{10}+2x^{11}+x^{12}$$

$$g4=g2*g2=1+\ldots x^{24}$$

$$g8=g4*g4=1+\ldots x^{48}$$

The G4 table size is 4m−4 and the G8 table size is 8m−8, where m is the number of rings.

Now, if k=7, modify the cost function to 0,1,2,4,8,16,32 and the generating function becomes:

$$g1=1+x+x^2+x^4+x^8+x^{16}+x^{32}.$$

$$g2=g1*g1=1+2x+2x^3+2x^5+2x^6+2x^8+2x^9+2x^{10}+2x^{12}+2x^{16}+\ldots +2x^{40}+2x^{48}+x^{64}$$

$$g4=g2*g2=1+\ldots x^{128}$$

$$g8=g4*g4=1+\ldots x^{256}$$

The G4 table size is $1+2^k$ and the G8 table size is $1+2^{k+1}$, although there are some zeros.

The same mapping algorithm can be used, but the tables are much bigger, and the complexity is higher.

On the other hand, the large average distance may not be the only criterion. An alternative criterion is to minimize the frequency of the smallest segment. Since the errors are most likely in the smallest segment, this criterion may yield improved results. In order to obtain this result, the generating function may be implemented as:

$$g1=1+x+x^2+x^3+x^4+x^5+x^7.$$

In this case, any 8-point combination with at least one point in the smallest segment has a higher cost than all the 8-point combinations without any point in the smallest segment. In other words, the smallest segment is chosen only after all the combinations without that segment are used. As an extreme case, if the minimum frequency of the smallest distance is the only criterion, a simpler generating function may be implemented as:

$$g1=6+x$$

In this case, the cost function is 0,0,0,0,0,0,1 and only the smallest segment should not be used.

Another alternative criterion may be to reduce the use of the second smallest segment. This criterion may be obtained by implementing the following generating function:

$$g1=5+x+x^9$$

In this case, the cost function is 0,0,0,0,0,1,9 and only the smallest 2 segments should not be used. The table size is reasonable, and the performance may be slightly better than the above alternative embodiment.

If one of these cost functions is used, the cost is not simply the segment index. For instance, if the last cost function is used, cost 0 means segment 0 to 4, cost 1 means segment 5 and cost 9 means segment 6. In such a case, the segment which should be used may be determined by implementing a secondary generating function. Similar to the shell mapping algorithm above, the Z8 table is searched to find the total cost of 8 symbols. If the total cost is 0, a secondary generating function may be implemented as:

$$h1=1+x+x^2+x^3+x^4$$

$$h2=h1*h1$$

$$h4=h2*h2$$

Then using the same mapping algorithm, 8 segment indices may be obtained ranging from 0 to 4.

If the total cost of 8 symbols is not zero, continue to use the g4 table to split the cost of 8 into 2 costs of 4 symbols. If one of the 4-cost is zero, switch to the h2 table to obtain 4 segment indices from 0 to 4. Similarly, if the 4-cost is not zero, continue to use the g2 table to split the 4-cost into two 2-costs. If one of the 2-cost is zero, use h1 to obtain 2 segment indices. Note that the h tables are very small.

From "segment mapping", 8 segment indices (from 0 to m−1) are obtained. Index 0 means actual segment +8 and −8, with a total of 32 points. Five bits are then used to pick one of these 32 points. For the 6th symbol, due to the LSB being the robbed signaling bit, use only 4 bits to choose one of the 16 points.

Trellis code is a power technique to improve the performance. Using trellis coder 304, a 4D code may be used such as in V.34 modems. Symbols are one dimensional and four symbols may be combined as a 4D signal, and applied to the 4D code. The cost is one bit every 4D, i.e., 0.25 bit per symbol, or 2 kbps. In every 4 symbols, input 3 coding bits and generate 4 bits for selecting subset, possibly 1 bit for each symbol as the LSB to select between even and odd points. In such cases, there are k+27.5 bits per mapping frame. In the above example, k=15 and the data rate is 56.67 kbps.

Special consideration should be given to the robbed signaling bit in every 6th symbol as to how to do the Trellis code, since the robbed bit is also at the LSB, which selects between even and odd points. One possible solution is to use the coding bit as the bit 1 for the symbols with bobbed bit, namely, for that particular symbols, the signal distance is doubled. The Viterbi decoder will slice the signal differently for that symbol. In that case, there is a 1333 bps loss in data rate.

Note that the robbed signaling bit affects the selection of points within the segment, and does not affect the segment mapping itself. Therefore, the mapping frame size does not have to be 6. For example, the above-mentioned shell mapping algorithm may be used with the same mapping frame size 8.

The parser for a 1/6 robbed signaling bit is as follows. Define a large frame having 24 symbols, i.e., 3 mapping frames with 8 symbols each, or 6 coding frames with 4 symbols each. In the ith large frame, there are 3k segment mapping bits, 18 coding bits, and 92 uncoded bits.

$\{S_{i,0,1}, S_{i,0,2}, \ldots S_{i,0,k}\}$, $\{I1_{i,0}, I2_{i,0}, I3_{i,0}\}, \{Q_{i,0,0,1}, Q_{i,0,0,2}, \ldots Q_{i,0,0,4}\}, \{Q_{i,0,1,1}, Q_{i,0,1,2}, \ldots Q_{i,0,1,4}\}, \{Q_{i,0,2,1}, Q_{i,0,2,2}, \ldots Q_{i,0,2,4}\}, \{Q_{i,0,3,1}, Q_{i,0,3,2}, \ldots Q_{i,0,3,4}\}$, $\{I1_{i,1}, I2_{i,2}, I3_{i,1}\}, \{Q_{i,1,0,1}, Q_{i,1,0,2}, \ldots Q_{i,1,0,4}\}, \{Q_{i,1,1,1}, Q_{i,1,1,2}, Q_{i,1,1,3}\}, \{Q_{i,1,2,1}, Q_{i,1,2,2}, \ldots Q_{i,1,2,4}\}, \{Q_{i,1,3,1}, Q_{i,1,3,2}, \ldots Q_{i,1,3,4}\}$, $\{S_{i,1,1}, S_{i,1,2}, \ldots S_{i,1,k}\}$, $\{I1_{i,2}, I2_{i,2}, I3_{i,2}\}, \{Q_{i,2,0,1}, Q_{i,2,0,2}, \ldots Q_{i,2,0,4}\}, \{Q_{i,2,1,1}, Q_{i,2,1,2}, \ldots Q_{i,2,1,4}\}, \{Q_{i,2,2,1}, Q_{i,2,2,2}, \ldots Q_{i,2,2,4}\}, \{Q_{i,2,3,1}, Q_{i,2,3,2}, Q_{i,2,3,3}\}$.

$\{I1_{i,3}, I2_{i,3}, I3_{i,3}\}, \{Q_{i,3,0,1}, Q_{i,3,0,2}, \ldots Q_{i,3,0,4}\}, \{Q_{i,3,1,1}, Q_{i,3,1,1}, \ldots Q_{i,3,1,4}\}, \{Q_{i,3,2,1}, Q_{i,3,2,2}, \ldots Q_{i,3,2,4}\}, \{Q_{i,3,3,1}, Q_{i,4,3,2}, \ldots Q_{i,4,3,4}\}$.

$\{S_{i,2,1}, S_{i,2,2}, \ldots S_{i,2,k}\}$, $\{I1_{i,4}, I2_{i,4}, I3_{i,4}\}, \{Q_{i,4,0,1}, Q_{i,4,0,2}, \ldots Q_{i,4,0,4}\}, \{Q_{i,4,1,1}, Q_{i,4,1,2}Q_{i,4,1,3}\}, \{Q_{i,4,2,1}, Q_{i,4,2,2}, \ldots Q_{i,4,2,4}\}, \{Q_{i,4,3,1}, Q_{i,4,3,2}, \ldots Q_{i,4,3,4}\}$.

$\{I1_{i,5}, I2_{i,5}, I3_{i,5}\}, \{Q_{i,5,0,1}, Q_{i,5,0,2}, \ldots Q_{i,5,0,4}\}, \{Q_{i,5,1,1}, Q_{i,5,1,2}, \ldots Q_{i,5,1,4}\}, \{Q_{i,5,2,1}, Q_{i,5,2,2}, \ldots Q_{i,5,2,4}\}, \{Q_{i,5,3,1}, Q_{i,5,3,2}, \ldots Q_{i,5,3,3}\}$.

The data rate is (k+36.67) kbps for 1/6 robbed signaling bit. The data rates for different M values are listed in the following table.

TABLE 1

Data rates versus M values

| M | m | distance | k | date rate(kbps) | data rate for fully robbed |
|---|---|---|---|---|---|
| 224 | 7 | 2 | 22 | 58.67 | 52 |
| 192 | 6 | 4 | 20 | 56.67 | 50 |
| 160 | 5 | 8 | 18 | 54.67 | 48 |
| 128 | 4 | 16 | 16 | 52.67 | 46 |
| 96 | 3 | 32 | 12 | 48.67 | 42 |
| 64 | 2 | 64 | 8 | 44.67 | 38 |
| 32 | 1 | 128 | 0 | 36.67 | 30 |

For the fully robbed signaling bit case, the parser is simpler. The period is one mapping frame.

$\{S_{i,1}, S_{i,2}, \ldots S_{i,k}\}$, $\{I1_{i,0}, I2_{i,0}, I3_{i,0}\}, \{Q_{i,0,0,1}, Q_{i,0,0,2}, Q_{i,0,0,3}\}, \{Q_{i,0,1,1}, Q_{i,0,1,2}, Q_{i,0,1,3}\}, \{Q_{i,0,2,1}, Q_{i,0,2,1}, Q_{i,0,2,3}\}, \{Q_{i,0,3,1}, Q_{i,0,3,2}, Q_{i,0,3,3}\}$, $\{I1_{i,1}, I2_{i,1}, I3_{i,1}\}, \{Q_{i,1,0,1}, Q_{i,1,0,2}, Q_{i,1,0,3}\}, \{Q_{i,1,1,1}, Q_{i,1,1,2}, Q_{i,1,1,3}\}, \{Q_{i,1,2,1}, Q_{i,1,2,2}, Q_{i,1,2,3}\}, \{Q_{i,1,3,1}, Q_{i,1,3,2}, Q_{i,1,3,3}\}$, There are k segment mapping bits, 6 coding bits, and 24 uncoded bits in every mapping frame of 8 symbols. The data rate is (k+30) kbps. For different M values, the data rates listed in the above table.

From the table, it may be noted that to support a 56k baude data rate, only 192 points are required, and the smallest distance is 4. Hence, about a 40 dB SNR is required for reasonable performance. Consider the segment mapping gain and coding gain, 36 dB SNR may be enough. This requirement is certainly not be too difficult to meet. If the loop does not support this requirement, reduce M to 160. Then with 30 dB SNR, a 54.67 kbps data rate may be run.

Figure 4:
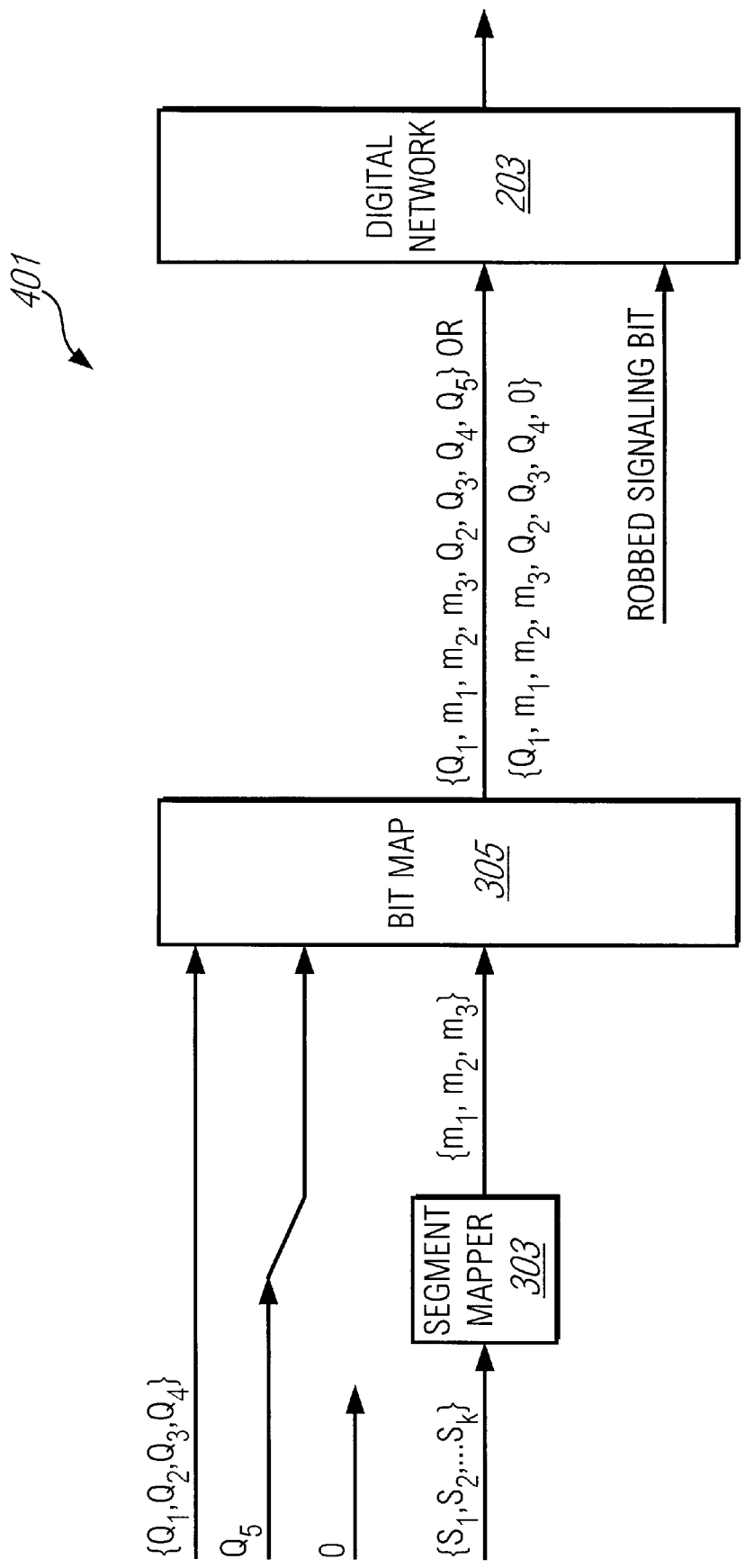
FIG. 4 is a block diagram of an uncoded encoder for a 56k baud modem communication system according to the present invention.

From the table, it may also be noted that k is typically reduced by 2 and the data rate is reduced by 2 kbps if m is reduced by 1. Reducing m by 1 provides a 6 dB noise margin. Therefore, instead of using coding, reduce m by 1 to get the same data rate with a better noise margin and simpler implementation of encoder 401 as shown in FIG. 4. The following table lists the data rates for an uncoded case.

TABLE 2

Data rates for an uncoded implementation

| M | m | distance | k | date rate(kbps) | SNR required |
|---|---|---|---|---|---|
| 224 | 7 | 2 | 22 | 60.67 | 46 |
| 192 | 6 | 4 | 20 | 58.67 | 40 |
| 160 | 5 | 8 | 18 | 56.67 | 34 |
| 128 | 4 | 16 | 16 | 54.67 | 28 |
| 96 | 3 | 32 | 12 | 50.67 | 22 |
| 64 | 2 | 64 | 8 | 46.67 | 16 |
| 32 | 1 | 128 | 0 | 38.67 | 10 |

It may be noted that the conventional convolutional code is not efficient, which may be due in part to the uneven signal distribution. In outer segments, the signals are so far apart that coding is not needed. Only the smallest segment needs help. An efficient step is to add redundancy only at the smallest segment.

The hybrid transformers have spectral null at DC, but the random data signal has a flat spectrum from 0 to 4 kHz. It is desired that the transmit signal does not have DC and very low frequency components.

Figure 5:
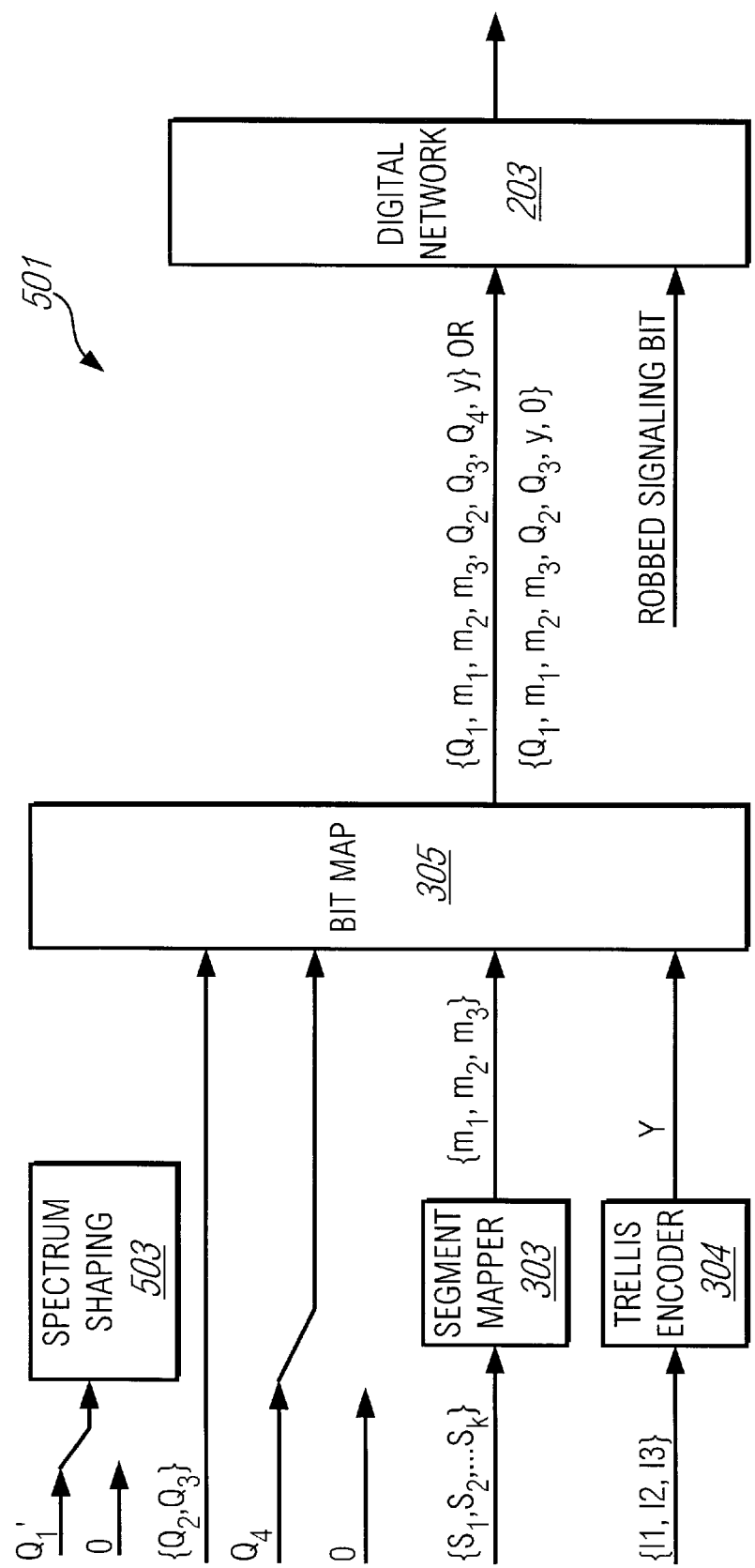
FIG. 5 is a block diagram of a coded encoder with spectrum shaping for a 56k baud modem communication system according to the present invention.
Figure 6:
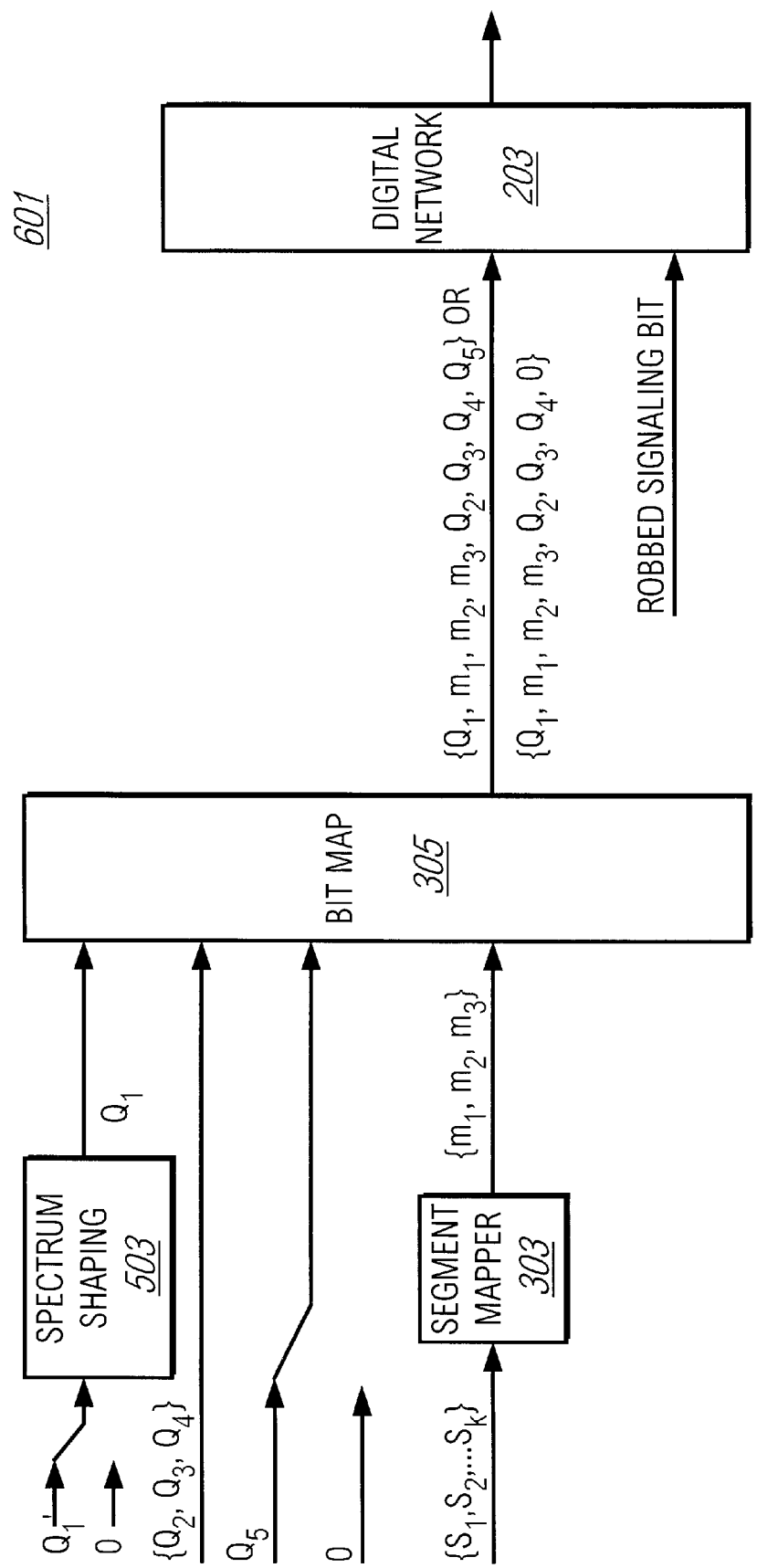
FIG. 6 is a block diagram of an uncoded encoder with spectrum shaping for a 56k baud modem communication system according to the present invention.

To eliminate the DC component, as discussed above, alternative embodiment of encoders 501, 601, coded and uncoded respectively, are shown in FIGS. 5 and 6 which includes DC suppressor (spectrum shaper) 503 for shaping the spectrum. Every 4 symbols, the first 3 symbols are generated as usual. A running sum of all the previously sent symbols is maintained. If the running sum is negative, the 4th symbol is made positive; and vise versa. In this way, the DC signal and very low frequency components are suppressed. Overall, for random input data, the probabilities for the fourth symbol to be positive and negative are the same.

With this scheme, the data rate table becomes the following.

TABLE 3

Date rate with DC suppressor

| M | m | distance | k | date rate(uncoded) | data rate(coded) |
|---|---|---|---|---|---|
| 224 | 7 | 2 | 22 | 58.67 | 56.67 |
| 192 | 6 | 4 | 20 | 56.67 | 54.67 |
| 160 | 5 | 8 | 18 | 54.67 | 52.67 |
| 128 | 4 | 16 | 16 | 52.67 | 50.67 |
| 96 | 3 | 32 | 12 | 48.67 | 46.67 |
| 64 | 2 | 64 | 8 | 44.67 | 42.67 |
| 32 | 1 | 128 | 0 | 36.67 | 34.67 |

It may be noted that 56 kbps is still possible.

It is also possible to increase M by 16 while keeping the smallest distance the same. Specifically, every other point may be used in the smaller segment. For example, 16 points may be used in segment 2 together with 192 points in segment 3 to 8, and keep the smallest distance 4. To use the mapping algorithm, the number of points in each group should be the same. Hence, divide the total of M points into m=M/16 group, i.e., one normal segment is divided into 2 groups, and the smallest segment, which has only half the points, has only 1 group. Now, m ranges from 1 to 15. We use 4 bits to choose one point from each group. By using more points, the data rate may be increased typically by 1 or 2 kbps. In the mapping algorithm, the generating function for odd m can be:

$$g1=(m-3)+3x; \quad h1=1+x+x^2+\ldots x^{m-4};$$

or $$g1=(m-5)+2x+3x^9, \quad h1=1+x+x^2+\ldots +x^{m-6};$$

A data rate table of the corresponding performance is shown below:

TABLE 4

Data rate using reduced points

| M | m | distance | k | date rate(uncoded) | data rate(coded) |
|---|---|---|---|---|---|
| 240 | 15 | 2 | 31 | 59.67 | 57.67 |
| 224 | 14 | 2 | 30 | 58.67 | 56.67 |
| 208 | 13 | 4 | 29 | 57.67 | 55.67 |
| 192 | 12 | 4 | 28 | 56.67 | 54.67 |
| 176 | 11 | 8 | 27 | 55.67 | 53.67 |
| 160 | 10 | 8 | 26 | 54.67 | 52.67 |
| 144 | 9 | 16 | 25 | 53.67 | 51.67 |
| 128 | 8 | 16 | 24 | 52.67 | 50.67 |
| 112 | 7 | 32 | 22 | 50.67 | 48.67 |
| 96 | 6 | 32 | 20 | 48.67 | 46.67 |
| 80 | 5 | 64 | 18 | 46.67 | 44.67 |
| 64 | 4 | 64 | 16 | 44.67 | 42.67 |
| 48 | 3 | 128 | 12 | 40.67 | 38.67 |
| 32 | 2 | 128 | 8 | 36.67 | 34.67 |
| 16 | 1 | 256 | 0 | 28.67 | 26.67 |

With reference again to FIG. 2, the 64 kb/s digital signal goes through digital network 203, and is then converted into analog signal through $\mu$-law D/A converter 205. This analog signal goes through the analog local loop and arrives at 56k analog modem receiver 201.

Figure 7:
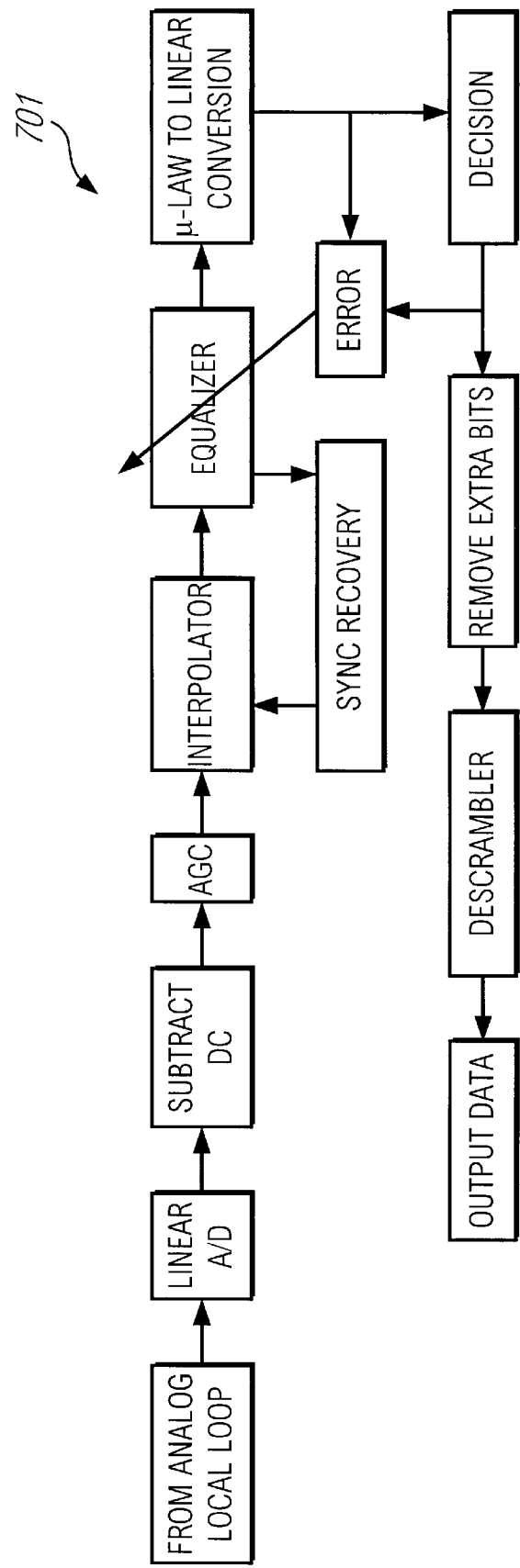
FIG. 7 is a block diagram of an analog side, half duplex modem receiver according to the present invention.

With reference to FIG. 7, half duplex, analog 56k modem receiver 701 is shown. The analog signal from the local loop is converted to digital by a linear A/D converter. Since it is not easy to perfectly control the input analog signal level and sampling clock, a $\mu$-law A/D is not implemented at this location. Instead, a linear A/D converter is used and the $\mu$-law to linear conversion is done after subtracting DC, AGC, interpolator and equalizer. The equalizer output should match the linearly-quantized signal of the $\mu$-law D/A output at the local central office. The equalizer output is converted by $\mu$-law to linear conversion to obtain the digital signal sent in the network. After the decoder (Viterbi decoder for coded version and simple slicer for uncoded version) decodes the received signal, the segment mapping decoder operates to obtain the k mapping bits. The robbed signaling bit and spectrum shaping bit are removed, and the descrambler operates to obtain the user data.

The equalizer runs at an 8k sampling rate, hence for a span of 40 symbols, about 96 taps are required. Since only one local loop has to be equalized, the span may be reduced. However, since the signal spectrum is wider and the channel has a null at DC and high attenuation near 4 kHz, a relatively long span may be necessary.

Figure 8:
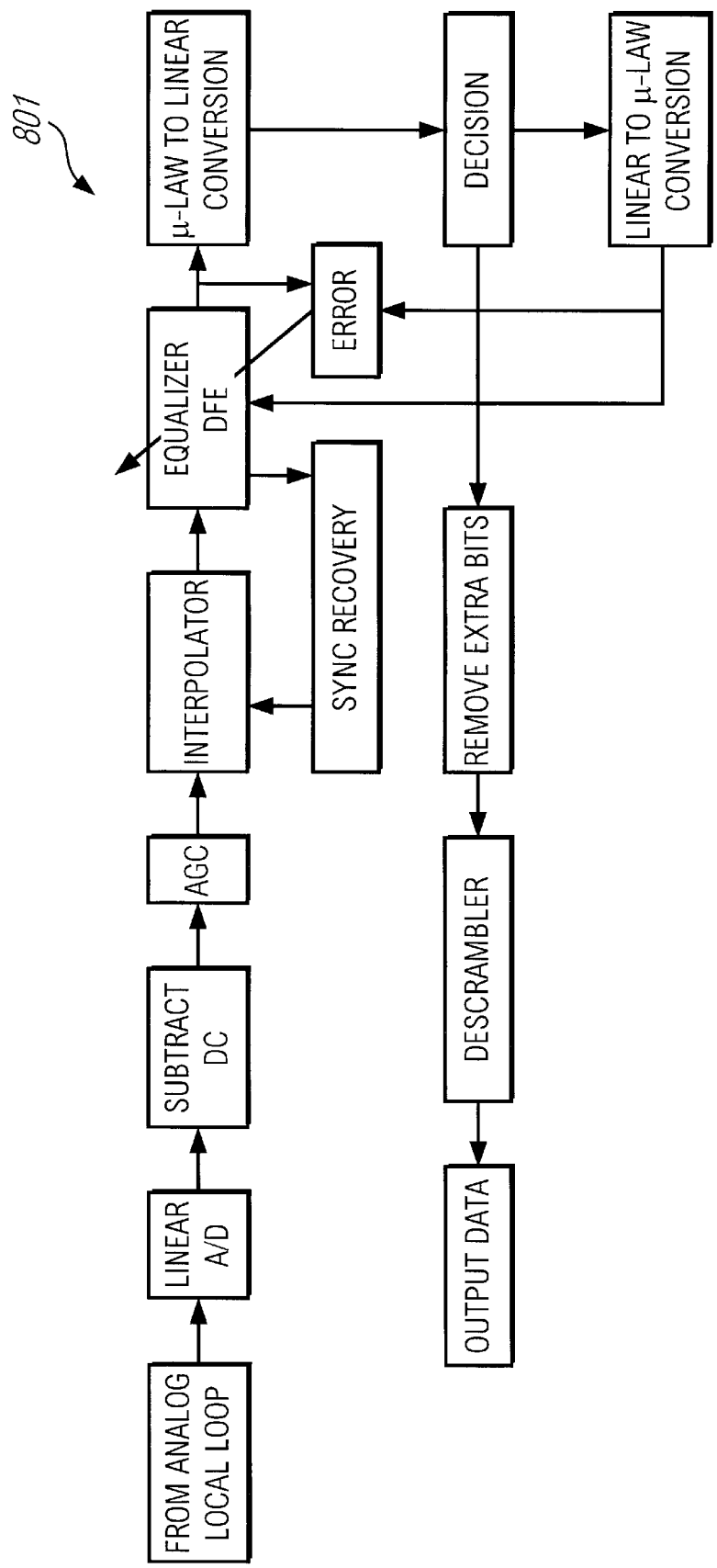
FIG. 8 is a block diagram of an alternative embodiment of an analog side, half duplex modem receiver according to the present invention.

To avoid noise enhancement by the linear equalizer, decision feedback equalizer can be used, especially when coding is not used, and thus decoding delay is not eliminated. The decision feedback equalizer is shown in FIG. 8.

Figure 9:
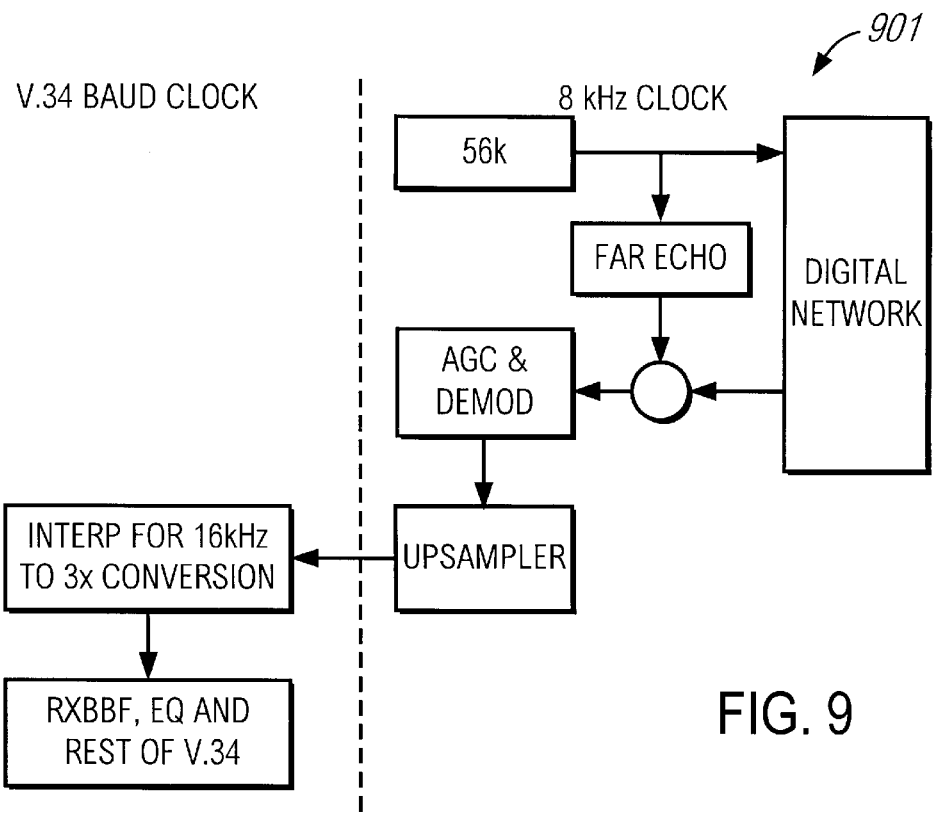
FIG. 9 is a block diagram of an analog side, full duplex modem receiver according to the present invention.

With reference to FIG. 9, full duplex, 56k modem 801 is shown. The 56k transmission as discussed above is only in the direction from digital to analog. In the other direction, a less radical operation is required.

Note that since there is no near echo, therefore only a far echo canceller is required. The input to the echo canceller is the real transmitted signal which does not have a flat spectrum, if spectrum shaping is used. This may affect the initial convergence speed. Both the input and the output sampling rate of the far echo canceller are 8k. Since the transmitted signal is real with only 8 bit precision, we can use one word for 2 samples in the far echo bulk delay line. For 1.2 second round trip delay, the bulk delay line needs 4.8k words. 96 taps may be used for the far echo canceller for a time span similar to that in a V.34 far echo canceller at 3429 baud rate. Note that the input delay line needs also 96 words.

Automatic gain control (AGC) and demodulation are performed after the echo cancellation. A 1:2 upsampler is used before the interpolator to increase the sampling rate to 16 kHz. A baseband 3rd order sinc interpolator can be used for both the 16k to 3x conversion and the timing recovery at the same time. After the interpolator, the devices and operations are conventional.

Figure 10:
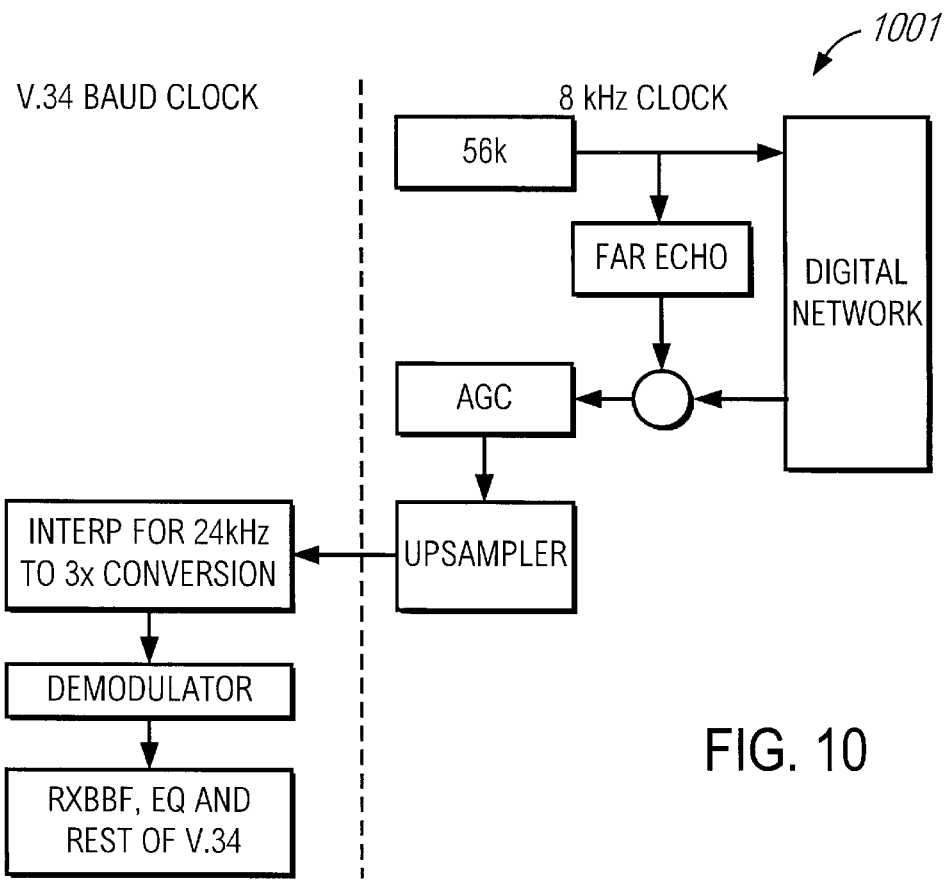
FIG. 10 is a block diagram of an alternative embodiment of an analog side, full duplex modem receiver according to the present invention.

One of the disadvantages of this structure is that the demodulation is done at an 8 kHz sampling rate. This makes the sine/cosine table used for the demodulator very long. To avoid this problem, an alternative embodiment is shown in FIG. 10.

After AGC, a 1:3 upsampler may be used to increase the sampling rate to 24k. The passband sampling rate conversion and timing recovery are followed by a 3x demodulator, which requires much shorter sine/cosine tables.

Figure 11:
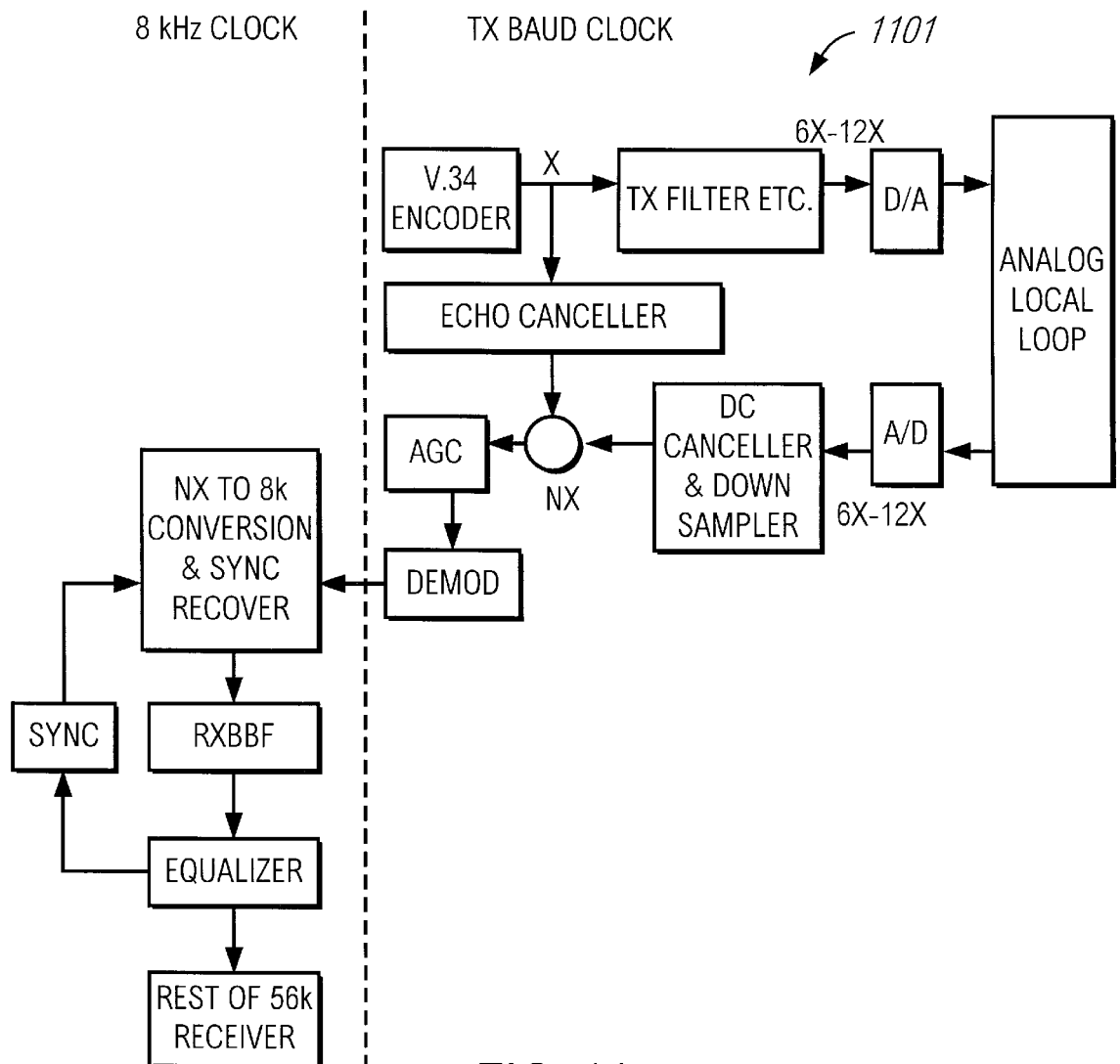
FIG. 11 is a block diagram of an alternative embodiment of an analog side, full duplex modem receiver according to the present invention.

With reference to FIG. 11 wherein duplex modem 1101 is shown. Note that since the 56k received signal uses the sampling clock 8 kHz, and its spectrum is up to 4 kHz, the down sampler output rate has to be $\geq 8$ kHz. A 3x rate is acceptable except at 2400 baud, where 4x should be used. But at 2400 baud, a smaller number of taps may be used for each subcanceller. For example, 40 taps in each subcanceller may be used for all the other baud rates, and only 30 taps for 2400 baud, so the total number of taps is still 120.

After the echo cancellation, and AGC, an upsampler is used to get mnx sampling rate. This upsampler is necessary because the 8k sampled received signal has a spectrum from 4 kHz to 4 kHz, which is much wider than that of the baseband 3x V.34 signal. For a 3rd order sinc interpolater, m=3 seems appropriate. A baseband 3rd order sinc interpolator can be used for both the mnx to 8k conversion and the timing recovery at the same time.

Figure 1C:
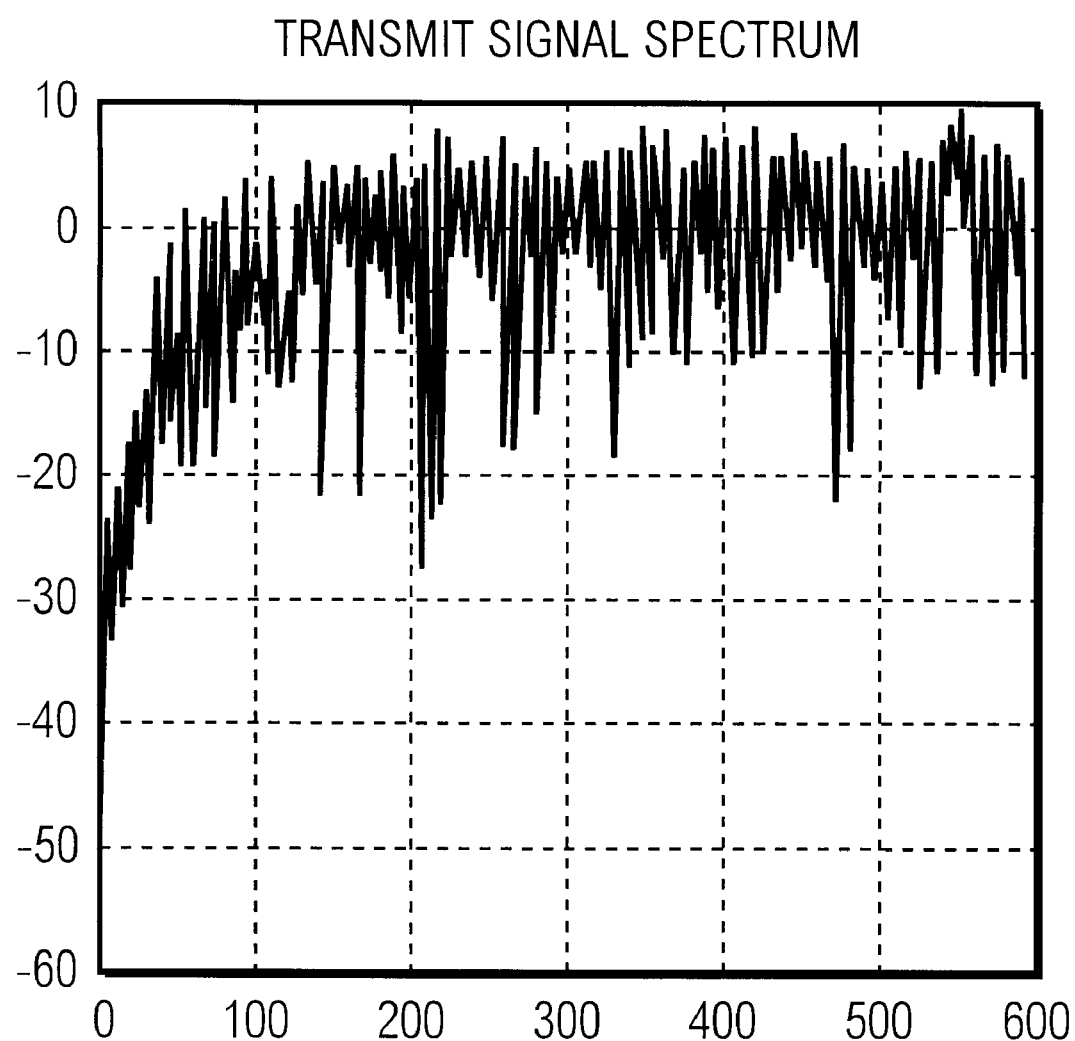
FIG. 1C is a transmittal signal spectrum according to the present invention.

With reference again to FIGS. 1, 2 as discussed above, the symbol rate utilized by 56k modems 101,102 is 8 kHz. The encoder takes the scrambled input binary data to generate output digital symbols. These symbols are sent through the digital network to the $\mu$-law D/A on the other side and converted into analog signals.

The $\mu$-law D/A uses a total of 255 possible signal levels which are divided into 16 segments: +1, +2, . . . +8, −1, −2, . . . −8. The distance between two adjacent points in the i-th segment is $c*2^{|i-1|}$. For simplicity, we let c=1.

Segments +1 and −1 have the smallest distance 1, and the point 0 is shared by both segments. Furthermore, many codecs have poor performance at these small points. Therefore, we often exclude these two segments, and use the remaining 224 points. It is though possible to use part of these small points, as we will discuss later. We can also exclude more small points to increase the smallest distance. For every 32 points excluded, the smallest distance is doubled, and thus we gain 6 dB noise margin. During training, the 56k receiver measures the channel conditions, such as SNR and the codec characteristics, and decides how many points should be used, and informs the remote transmitter.

Since the number of points is typically not 2's power, to maximize the data rate, we can use the frame mapping techniques, an example of which is the shell mapping algorithm used by V.34.

In V.34 modems, the shell mapping maps binary data into 2-dimensional QAM signal points. In 56k modems, all the signal points are one-dimensional. We can divide all the points we intend to use into m groups. In $\mu$-law codecs, the one-dimensional points are divided into 16 segments. Suppose we use 2m among these 16 segments: $\pm(9-m)$, . . . , $\pm 7$, $\pm 8$, m=1,2, . . . 7. One natural way to divide the points is to have +i and −i segments into one group with group index 8-i. Namely, the outer segments have smaller group indices. Among all the points we can use, we prefer to use outer points more often because they have larger distances. This is in contrast to the V.34 shell mapping, where we prefer to use small points more often to minimize the average power for some shaping gain. To reach that goal, the shell mapping algorithm used in V.34 can be applied here, but the cost function has to be changed.

The details of the mapping scheme for 56k modems is described as follows.

In V.34, we order the rings from the smallest energy to the largest, and make the cost function be the ring index. Here, we order the group indices from the largest energy to the smallest energy. Suppose we can use M points, and we send K bits in a frame of N symbols, so the data rate is 8000K/N bits/sec. The M points are divided into m=M/32 groups with indices 0,1, . . . m−1. Note that K/N, which is the bit per symbol, does not have to be an integer, and even K does not either. A frame switch scheme similar to that in V.34 can be used for non-integer K cases. However, for the simplicity, we can assume K be an integer. We need 5 bits to select a point within the group, hence we use k=K-5N bits to do the "group mapping", similar to the shell mapping in V.34. The largest possible k can be found from the following inequality:

$$2^k \leq m^N$$

For example, if we use 192 points, and the mapping frame size is 8, then m=6, and $k \leq 20.68$. Suppose we use k=20, we will send 7.5 bits per symbol, and the data rate will be (k+5N)*8000/N=60 kbps.

Similar to the V.34 shell mapping, we do not have to use the largest possible k. In other words, for the same k, we don't have to use the smallest possible m. In V.34 case, if we use a larger m, we obtain some shaping gain. Here, for larger m, we have to use some even smaller points, and thus reduce the minimum distance. However, since the smallest points are the most critical points, a larger m is usually not preferred.

The segment mapping algorithm can be the same as the shell mapping algorithm in V.34, if we let N=8. The key is to choose a proper cost function to optimize the performance while keeping the memory and complexity requirement low.

In the shell mapping algorithm used by V.34, the cost function is chosen to be a ramp function, i.e., the cost is equal to the ring index. This cost function can be represented by a generating function:

$$g_1 = 1+x+x^2+x^3+x^4+x^5+ \ldots x^{m-1}.$$

This is a good cost function for minimizing the averaged power, since the average power in a ring is approximately proportional to the ring index. If we use the same cost function here, we will get more outer groups than inner groups, but the performance is not optimal. For example, let us consider N=2 for simplicity, and m=7. The i-th group has a cost I, i=0,1, . . . 6. Then using one symbol in group 0 and the other in group 6 results in a lower total cost (0+6=6) than using two in group 4 (4+4=8). The later is preferred since no smallest point is used and the smallest points are where the errors will most likely occur. The ramp cost function can minimize the averaged group indices, which does not minimize the error rate since the error probabilities for different groups are quite different. The total error probability P is $$P = P_0 f_0 + P_1 f_1 + \ldots + P_{m-1} f_{m-1}$$

where $P_1$ is the error probability for points in group i, $f_1$ is the relative occurrence frequency(probability) for group i, i=0,1, ... m−1. Since $P_i$(i=0,1, ... m−2) is much smaller than $P_{m−1}$, the total error probability is approximately equal to $P_{m−1}f_{m−1}$. A better criterion here is to minimize $f_{m−1}$, the frequency of the smallest group. To do that, the following cost function can be used:

$$(0,1,2, \ldots, m-2, 8(m-2)+1)$$

The generating function for m=7 is:

$$g_1 = 1 + x + x^2 + x^3 + x^4 + x^5 + x^{41}.$$

In this case, any 8-point combination with at least one point in the smallest group has a higher cost than all the 8-point combinations without any point in the smallest segment. As a result, using this cost function, the 8-tuples are ordered as follows.

$$(0SG), (1SG), (2SG), \ldots (8SG) \text{ (SG: smallest group)}$$

Since $2^k$ is usually smaller than $m^N$, we usually do not use up all the 8-tuple combinations, we can exclude those with more smallest group to reduce $f_{m−1}$, and thus reduce the error rate accordingly.

The disadvantage of such a cost function is that the order of the generating function is too high, which requires large tables and higher complexity. To avoid these problems, a two-step mapping algorithm is proposed below. Using this new algorithm, the memory and complexity is similar to the mapping algorithm based on ramp cost function, while achieving the same performance as the one discussed above.

Since the minimum frequency of the smallest points is the only criterion, we can use a very simple generating function:

$$g_1 = (m-1) + x$$

In this case, the cost function is 0,0,0, ... , 0,1, namely, we don't care which group is used except the smallest group.

With this cost function, the cost is not simply the group index. For example, cost 0 means group 0 to m−2, cost 1 means group m−1, the group with the smallest distance. Now the problem is for cost 0, how can we tell which group is used. To solve this problem, we can use a secondary generating function:

$$g'_1 = 1 + x + x^2 + \ldots + x^{m-2}$$

$$g'_2 = g'_1 * g'_1$$

$$g'_4 = g'_2 * g'_2 \rightarrow z'_4$$

$$g'_8 = g'_4 * g'_4 \rightarrow z'_8$$

Similar to the V.34 shell mapping algorithm, we first search through the first $Z_8$ table, which is only 8 long now, to find the total cost of 8 symbols. If the total cost is 0, we then switch to the secondary generating function, search through $z'_8$ and do the rest of mapping exactly the same as what we do in V.34 shell mapping to get 8 group indices ranging from 0 to m−2, based on the secondary generating function.

If the total cost of 8 symbols is not zero, we continue to use $g_4$ table to split the cost of 8 into 2 costs of 4 symbols. If one of the 4-costs is zero, we switch to the secondary generating function, use the residue to search through $z'_4$(or simply use $g'_4$ table) to find the secondary 4-cost, and finally the 4 group indices from 0 to m−2. Similarly, if the 4-cost is not zero, we continue to use $g_2$ table to split the 4-cost into two 2-costs. If one of the 2-cost is zero, we switch to the secondary generating function to compute the secondary 2-cost, and finally the 2 group indices from 0 to m−2. Note that both the first set and the second set of tables are small. The total table size is approximately the same as that for the V.34-type ramp cost function. The total complexity is also similar.

From group mapping, we obtain 8 group indices (from 0 to m−1). Index i means actual segment +(8-i) and -(8-i), with a total of 32 points. Five bits are then used to pick one of these 32 points.

The data rate is (k+40) kbps. The data rates for different M values are listed in the following table.

TABLE 5

Data rate versus M values

| M | m | min distance | k | date rate(kbps) | $f_{m-1}$(new) | $f_{m-1}$(ramp) | $f_{m-1}$(new)/$f_{m-1}$(ramp) |
|---|---|---|---|---|---|---|---|
| 224 | 7 | 2 | 22 | 62 | 0.0831 | 0.105 | 0.791 |
| 192 | 6 | 4 | 20 | 60 | 0.0824 | 0.1123 | 0.734 |
| 160 | 5 | 8 | 18 | 58 | 0.125 | 0.1436 | 0.87 |
| 128 | 4 | 16 | 16 | 56 | 0.25 | 0.25 | 1.0 |
| 96 | 3 | 32 | 12 | 52 | 0.234 | 0.2448 | 0.956 |
| 64 | 2 | 64 | 8 | 48 | 0.5 | 0.5 | 1.0 |
| 32 | 1 | 128 | 0 | 40 | 1.0 | 1.0 | 1.0 |

In the table, the relative frequencies of the smallest group $f_{m-1}$ using the new algorithm and the original V.34-type mapping with ramp cost function, and their ratio are also listed. We can see that for the m values of practical interest (relatively large), $f_{m-1}$(also the error rate) is reduced by more than 20%. For small m, since we have to use up all, or almost all possible 8-combinations available, the new algorithm, actually any algorithm can not help. But these cases are of little practical interest.

From the table, we can see that k is typically reduced by 2 and the data rate is reduced by 2 kbps if m is reduced by 1. Reducing m by 1 means the smallest distance is doubled, which gives us about 6 dB more noise margin. Therefore, if any coding technique is used to improve the performance, more than 6 dB coding gain is expected at the cost of 1/4 bit/symbol or less.

It is also possible to increase M by 16 while keeping the smallest distance the same. Specifically, we can use every other points in the group smaller that smallest group we otherwise use. For example, we can use 16 points in group 6 together with 192 points in groups 0 to 5, and keep the smallest distance 4. To use the group mapping algorithm, the number of points in each group has to be the same. Hence, we can divide the total of M points into m=M/16 group, i.e., one group we discussed before is now divided into 2 smaller groups Now, m ranges from 1 to 15. We use 4 bits to choose one point from each group. By using more points, we can increase the data rate, typically by 1 or 2 kbps. In the mapping algorithm, the generating function for odd m is:

$$g_1 = (m-1) + 3x;$$

The secondary generating function for cost 0 is:

$$g'_1 = 1 + x + x^2 + \ldots + x^{m-4}.$$

The secondary generating function for cost 1 is:

$$g''_1 = 1 + x + x^2$$

For even M, we can use $g_1 = (m-2) + 2x = 2[(m/2-1) + x]$, but the result is the same as the one we used before.

The data rate is (k+32) kbps, and is listed below.

TABLE 6

| | | | | Data rate including fmin | | | |
|---|---|---|---|---|---|---|---|
| M | m | min dis. | k | date rate(kbps) | $f_{min}$ new | $f_{min}$ ramp | $f_{min}$ new/ $f_{min}$ ramp |
| 240 | 15 | 2 | 31 | 63 | 0.1560 | 0.1676 | 0.9308 |
| 224 | 14 | 2 | 30 | 62 | 0.0831 | 0.1055 | 0.7877 |
| 208 | 13 | 4 | 29 | 61 | 0.1476 | 0.1668 | 0.8849 |
| 192 | 12 | 4 | 28 | 60 | 0.0824 | 0.1125 | 0.7324 |
| 176 | 11 | 8 | 27 | 59 | 0.1729 | 0.1964 | 0.8803 |
| 160 | 10 | 8 | 26 | 58 | 0.1250 | 0.1442 | 0.8669 |
| 144 | 9 | 16 | 25 | 57 | 0.2685 | 0.2783 | 0.9648 |
| 128 | 8 | 16 | 24 | 56 | 0.25 | 0.25 | 1 |
| 112 | 7 | 32 | 22 | 54 | 0.3485 | 0.3575 | 0.9748 |
| 96 | 6 | 32 | 20 | 52 | 0.2340 | 0.2470 | 0.9474 |
| 80 | 5 | 64 | 18 | 50 | 0.5061 | 0.5261 | 0.9731 |
| 64 | 4 | 64 | 16 | 48 | 0.5 | 0.5 | 1 |
| 48 | 3 | 128 | 12 | 44 | 1 | 1 | 1 |
| 32 | 2 | 128 | 8 | 40 | 1 | 1 | 1 |
| 16 | 1 | 256 | 0 | 32 | 1 | 1 | 1 |

Listed also in the table are $f_{min}$, the probabilities of the points with the smallest distance being used for the proposed cost function and the ramp cost function used by V.34 shell mapping, and their ratio. It can be seen that by adding 16 more points, although the minimum distance is unchanged, the number of the smallest points is increased by 50%, and thus the possibility of using these smallest points is usually increased, so is the error probability. Therefore, the increase in data rate is not totally free of cost in performance. In addition, the table sizes and complexity is increased due to larger m and k values, although they are still quite reasonable.

The data rates listed in the table are calculated without considering any reduction due to some other causes, such as robbed signaling bits, which will cost 1.33 kbps in data rate.

What is claimed is:

1. A modem device for transmission and reception of data over a network comprising:

a first mapper for establishing data points according to a primary generating function which reduces the use of the small points of a point spectrum; and a second mapper for establishing data points having a low cost, for reducing the average power for a given shaping gain.

2. A method for transmitting digital data over a network including:

mapping digital data to establish data points by comparing distances between respective ones of said data points; and skipping those data points which are near to zero in order to reduce the average power for a given shaping gain.

* * * * *